(12) United States Patent
Le et al.

(10) Patent No.: US 12,112,561 B2
(45) Date of Patent: Oct. 8, 2024

(54) INTERACTIVE VISUAL REPRESENTATION OF SEMANTICALLY RELATED EXTRACTED DATA

(71) Applicant: FIGMA, Inc., San Francisco, CA (US)

(72) Inventors: Amy Pham Le, San Francisco, CA (US); Joren Lauwers, San Francisco, CA (US); Richard Vaughan Stebbing, San Francisco, CA (US); Ankur Goyal, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 527 days.

(21) Appl. No.: 17/534,105

(22) Filed: Nov. 23, 2021

(65) Prior Publication Data

US 2023/0162517 A1    May 25, 2023

(51) Int. Cl.
*G06V 30/412*    (2022.01)
*G06F 3/0482*    (2013.01)
*G06V 30/19*    (2022.01)

(52) U.S. Cl.
CPC .......... *G06V 30/412* (2022.01); *G06F 3/0482* (2013.01); *G06V 30/1916* (2022.01)

(58) Field of Classification Search
CPC . G06V 30/412; G06V 30/1916; G06F 3/0482
USPC ...................................................... 382/100
See application file for complete search history.

(56) References Cited

U.S. PATENT DOCUMENTS

| | | |
|---|---|---|
| 7,313,567 B1 | 12/2007 | Leung |
| 8,046,751 B1 | 10/2011 | Avadhanula |
| 8,739,016 B1 | 5/2014 | Goldman |
| 9,146,659 B2 | 9/2015 | Spaulding |
| 9,436,760 B1 | 9/2016 | Tacchi |
| 9,513,778 B1 | 12/2016 | Zhang |
| 9,836,183 B1 | 12/2017 | Love |
| 9,911,211 B1 | 3/2018 | Damaraju |
| 10,572,522 B1 | 2/2020 | Goyal |
| 11,699,297 B2 * | 7/2023 | Gao ............ G06F 40/186 382/229 |
| 2006/0167928 A1 | 7/2006 | Thambiratnam |
| 2006/0184547 A1 | 8/2006 | Kamiya |
| 2006/0184873 A1 | 8/2006 | Kamiya |
| 2007/0179784 A1 | 8/2007 | Thambiratnam |
| 2008/0154936 A1 | 6/2008 | Mihaila |
| 2009/0044095 A1 | 2/2009 | Berger |

(Continued)

FOREIGN PATENT DOCUMENTS

| | | |
|---|---|---|
| CA | 2636091 | 7/2007 |
| CN | 104036048 | 9/2014 |

(Continued)

OTHER PUBLICATIONS

IBM Tririga, "CAD Integrator/Publisher User Guide" (2020).

*Primary Examiner* — Neil R McLean
(74) *Attorney, Agent, or Firm* — Mahamedi IP Law LLP

(57) ABSTRACT

Techniques are disclosed to provide an interactive visual representation of semantically related extracted data. In various embodiments, a plurality of data entities are extracted from a file, each entity comprising a key-value pair. One or more sets of related entities, each set comprising an occurrence of a defined repeating type of entity set, are identified among the plurality of data entities. Data associating the one or more sets of related entities with the file and the defined repeating type of entity set are stored.

20 Claims, 9 Drawing Sheets

(56) References Cited

U.S. PATENT DOCUMENTS

| | | |
|---|---|---|
| 2011/0040808 A1 | 2/2011 | Joy |
| 2011/0282941 A1 | 11/2011 | Chan |
| 2012/0127177 A1 | 5/2012 | Kent |
| 2013/0318160 A1 | 11/2013 | Beraka |
| 2014/0074889 A1 | 3/2014 | Neels |
| 2014/0108322 A1 | 4/2014 | Buchanan |
| 2014/0156581 A1 | 6/2014 | Jayaraman |
| 2014/0201124 A1 | 7/2014 | Proctor |
| 2015/0019460 A1 | 1/2015 | Simard |
| 2015/0095303 A1 | 4/2015 | Sonmez |
| 2016/0078022 A1 | 3/2016 | Lisuk |
| 2016/0179313 A1* | 6/2016 | Ho .................. G06F 18/2178 715/776 |
| 2016/0232226 A1 | 8/2016 | McManis |
| 2016/0371238 A1 | 12/2016 | Heavenrich |
| 2017/0032052 A1 | 2/2017 | Raman |
| 2017/0039341 A1 | 2/2017 | Shklarski |
| 2017/0075904 A1 | 3/2017 | Hedges |
| 2017/0286489 A1* | 10/2017 | Dantressangle .... G06F 16/2455 |
| 2017/0329844 A1 | 11/2017 | Tacchi |
| 2017/0330106 A1 | 11/2017 | Lindsley |
| 2018/0113865 A1 | 4/2018 | Najork |
| 2018/0181750 A1 | 6/2018 | Lamothe-Brassard |
| 2018/0330331 A1 | 11/2018 | Nair |
| 2018/0373952 A1 | 12/2018 | Bui |
| 2019/0073420 A1 | 3/2019 | Agapiev |
| 2019/0138345 A1 | 5/2019 | Singh |
| 2019/0138654 A1 | 5/2019 | Arora |
| 2019/0379797 A1* | 12/2019 | Sahagun .............. G06V 30/416 |
| 2020/0075165 A1 | 3/2020 | Lieberman |
| 2020/0097601 A1 | 3/2020 | Han |
| 2020/0341978 A1 | 10/2020 | Shah |
| 2021/0034625 A1 | 2/2021 | Shah |
| 2021/0194888 A1 | 6/2021 | Bhaskar |
| 2021/0398025 A1 | 12/2021 | Yamamoto |
| 2022/0075515 A1 | 3/2022 | Floren |
| 2022/0253719 A1 | 8/2022 | Ramos |
| 2022/0284362 A1 | 9/2022 | Bellinger |

FOREIGN PATENT DOCUMENTS

| | | |
|---|---|---|
| CN | 103729395 | 11/2017 |
| CN | 111311461 | 6/2020 |
| JP | 2007293874 | 11/2007 |
| KR | 101226163 | 1/2013 |
| WO | WO-2015/0095915 | 7/2015 |
| WO | WO-2020/0139861 | 7/2020 |

* cited by examiner

200

Purchase Order ⟍
202

Acme Corp
123 Drury Ln
Pittsburgh PA 15213 ⟍ 204

P.O. No. 9945 ⟍ 206

Ship to:
Customer Corp ⟋ 208
456 Destiny Ln
Sample MO 34456

210

| Date | Contact | Ship via | Terms |
|------|---------|----------|-------|
| 3/1/21 | Carol G | ground | net 30 |

| Qty | Unit | Description | $/unit | Total |
|-----|------|-------------|--------|-------|
| 200 | 1 item | Rag doll<br>*Avg rating: 4.7* | $2.25 | $450 |
| 100 | 1 gal | Red paint<br>*Avg rating: 3.2* | $4.00 | $400 |
| 25 | 1 lb | Dog food<br>*Avg rating: 4.1* | $1.00 | $25 |
| Total | | | | $875 |

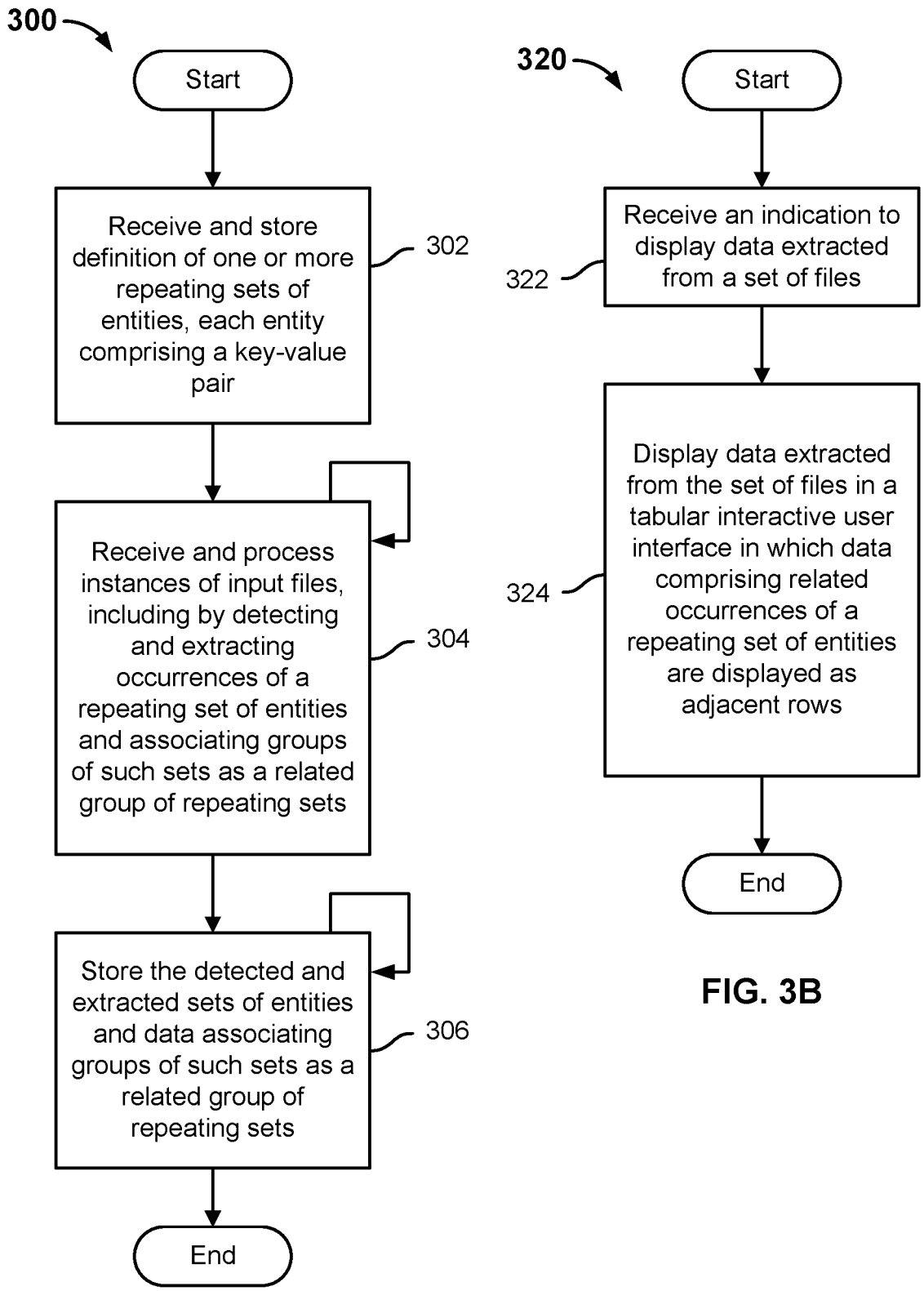

| | File | Line Items | | | | | |
|---|---|---|---|---|---|---|---|
| ☐ | | ☐ | Quantity | Unit | Description | Rating | Unit Price | Total |
| 1 | PO_9945.pdf | ∨ | | | | | | |
| | | 1 | 200 | 1 item | Rag Dolls | 4.7 | $2.25 | $450 |
| | | 2 | 100 | 1 gallon | Red Paint | 3.2 | $4.00 | $400 |
| | | 3 | 25 | 1 lb | Dog Food | 4.1 | $1.00 | $25 |
| 2 | PO_11341.pdf | ∨ | | | | | | |
| | | 1 | 50 | 1 gallon | Blue Paint | 4.4 | $4.00 | $200 |
| | | 2 | 1 | 1 website | Website Redesign | 3.9 | $12,500 | $12,500 |
| | | 3 | 60 | 1 item | Toy Truck | 4.8 | $2.50 | $150 |
| | | 4 | 100 | 1 set | Building Blocks | 4.3 | $3.00 | $300 |
| | | 5 | 5 | 1 item | Rug | 4.2 | $15.00 | $75 |
| | | 6 | 1000 | 1 item | Rubber Ball | 4.9 | $0.50 | $500 |
| | | 7 | 65 | 1 pair | Dice | 4.3 | $0.15 | |
| | | 8 | 20 | 1 bag | Candy | 4.0 | $0.10 | |
| 3 | PO_12345.pdf | ∨ | | | | | | |
| | | 1 | 100 | 1 item | Rag Dolls | 4.7 | $2.25 | $225 |
| | | 2 | 250 | 1 gallon | Blue Paint | 4.4 | $4.00 | $1,000 |
| | | 3 | 1 | 1 website | Website Redesign | 3.9 | $12,500 | $12,500 |
| | | 4 | 50 | 1 item | Toy Truck | 4.8 | $2.50 | $125 |
| | | 5 | 40 | 1 item | Rubber Ball | 4.9 | $0.50 | $20 |

FIG. 4A

| | File | Line Items | | | | | |
|---|---|---|---|---|---|---|---|
| | | Quantity | Unit | Description | Rating | Unit Price | Total |
| 1 | PO_9945.pdf | | | | | | |
| | | 1 | 200 | 1 item | Rag Dolls | 4.7 | $2.25 | $450 |
| | | 2 | 100 | 1 gallon | Red Paint | 3.2 | $4.00 | $400 |
| | | 3 | 25 | 1 lb | Dog Food | 4.1 | $1.00 | $25 |
| 2 | PO_11341.pdf | | | | | | |
| | | 1 | 50 | 1 gallon | Blue Paint | 4.4 | $4.00 | $200 |
| | | 2 | 1 | 1 website | Website Redesign | 3.9 | $12,500 | $12,500 |
| | | 3 | 60 | 1 item | Toy Truck | 4.8 | $2.50 | $150 |
| | | 4 | 100 | 1 set | Building Blocks | 4.3 | $3.00 | $300 |
| | | 5 | 5 | 1 item | Rug | 4.2 | $15.00 | $75 |
| | | 6 | 1000 | 1 item | Rubber Ball | 4.9 | $0.50 | $500 |
| | | 7 | 65 | 1 pair | Dice | 4.3 | $0.15 | |
| | | 8 | 20 | 1 bag | Candy | 4.0 | $0.10 | |
| 3 | PO_12345.pdf | | | | | | |
| | | 1 | 100 | 1 item | Rag Dolls | 4.7 | $2.25 | $225 |
| | | 2 | 250 | 1 gallon | Blue Paint | 4.4 | $4.00 | $1,000 |
| | | 3 | 1 | 1 website | Website Redesign | 3.9 | $12,500 | $12,500 |
| | | 4 | 50 | 1 item | Toy Truck | 4.8 | $2.50 | $125 |
| | | 5 | 40 | 1 item | Rubber Ball | 4.9 | $0.50 | $20 |

FIG. 4B

Purchase Order

Acme Corp
123 Drury Ln
Pittsburgh PA 15213

P.O. No. 9945

Ship to:
Customer Corp
456 Destiny Ln
Sample MO 34456

| Date | Contact | Ship via | Terms |
|---|---|---|---|
| 3/1/21 | Carol G | ground | net 30 |

| Qty | Unit | Description | $/unit | Total |
|---|---|---|---|---|
| 200 | 1 item | Rag doll  Avg rating: 4.7 | $2.25 | $450 |
| 100 | 1 gal | Red paint  Avg rating: 3.2 | $4.00 | $400 |
| 25 | 1 lb | Dog food  Avg rating: 4.1 | $1.00 | $25 |
| | | Total | | $875 |

Entity type:
Table

Name:
*Line Item*

Rating
4.7

Quantity
25

Submit

FIG. 5

INTERACTIVE VISUAL REPRESENTATION OF SEMANTICALLY RELATED EXTRACTED DATA

BACKGROUND OF THE INVENTION

Systems exist to parse files comprising unstructured, semi-structured, and/or structured data and extract and store key-value pairs of data. For example, a scanned image of a purchase order or other commercial document may be processed to identify text and numerical values and to label the extracted data. For example, the text "$4.35" may be extracted and recognized as a numerical value "4.35" with units of "dollar". The extracted value may be labeled in and/or by the system. For example, a user may explicitly label the above value as a "price", or the system may suggest that label and/or or automatically label the value, e.g., based on detection of the word "price" in a location near or otherwise significantly located in relation to the extracted value. The label may be used as a key to store the label and value as a key-value pair.

In some systems, a user interface may be provided to label or validate the suggested or automated labeling of extracted values. For a large enterprise or other data owner with a large number of data files, it can be tedious and inefficient to define and/or validate the label that should be associated with each extracted value.

Further, a document or other file may embody or encode information that may not be captured by a typical system, such as the relationship between key-value pairs extracted from a document or other file, and/or may not provide an efficient interface to validate automatically generated understandings of such relationships.

BRIEF DESCRIPTION OF THE DRAWINGS

Various embodiments of the invention are disclosed in the following detailed description and the accompanying drawings.

FIG. 2A is a diagram illustrating an example of a file such as may be processed in an embodiment of a data extraction system.

FIG. 3A is a flow diagram illustrating an embodiment of a process to extract data from files.

FIG. 3B is a flow diagram illustrating an embodiment of a process to provide an interactive tabular display of data extracted from a set of files.

FIG. 4A is a diagram illustrating an embodiment of an interactive tabular display of data extracted from a set of files.

FIG. 4B is a diagram illustrating an embodiment of an interactive tabular display of data extracted from a set of files.

FIG. 5 is a diagram illustrating an embodiment of a extracted data validation interface in an embodiment of a data extraction system.

DETAILED DESCRIPTION

Figure 1:
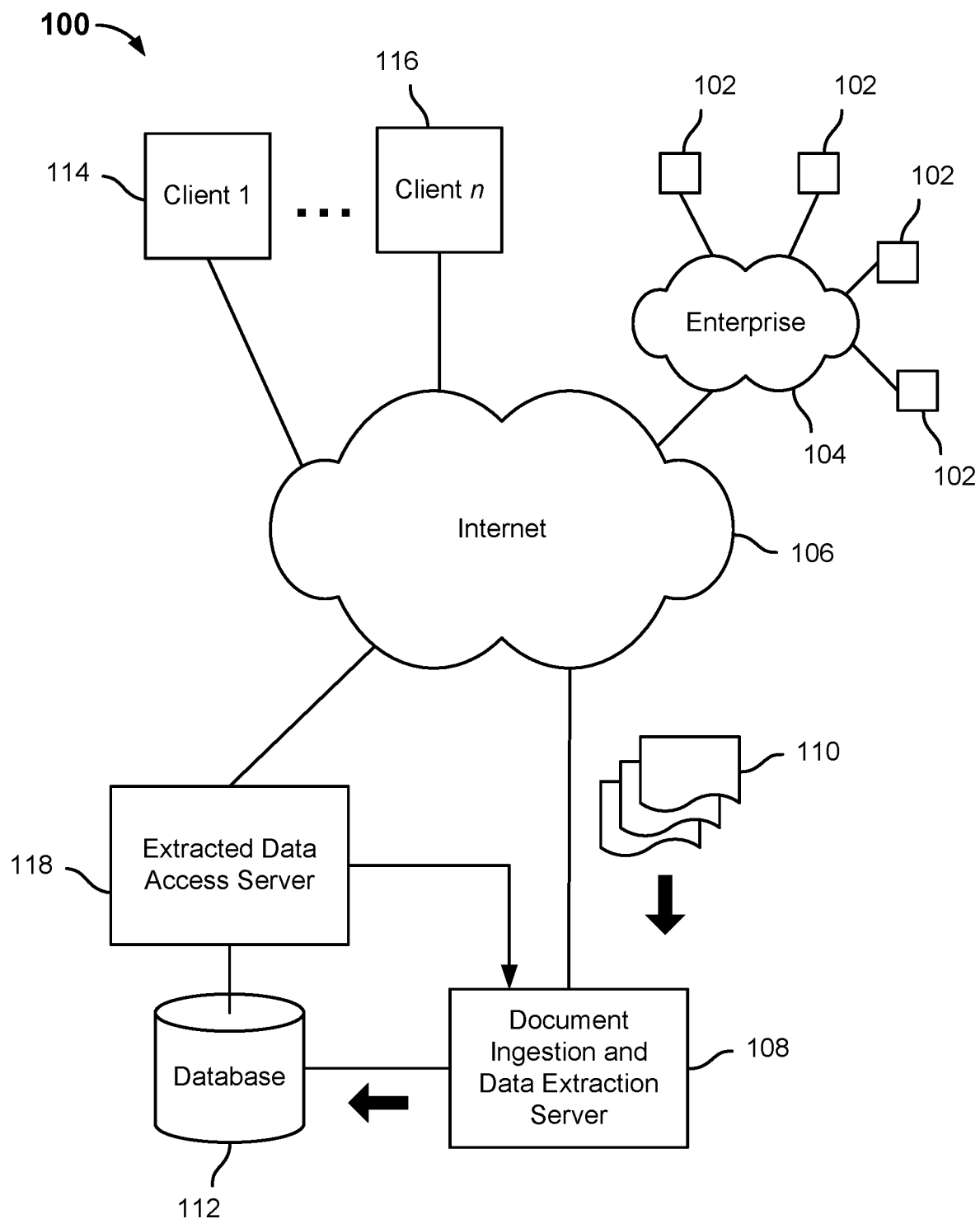
FIG. 1 is a block diagram illustrating an embodiment of a data extraction system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to extract semantically related sets of values from documents and other files. A definition is received of a repeating entity comprising a set of semantically related values, such as a row of a table. In various embodiments, a system as disclosed herein is configured (e.g., trained) to use the definition to identify and extract zero or more instances of the repeating entity from a document or other file. An interactive user interface is generated and displayed to provide in an efficient manner a visual representation, e.g., in a tabular format, of repeating entity instances extracted from one or more files. For each of at least a subset of extracted values, a visual indication may be provided to reflect a validation status of the data value. For example, color coding may be used to identify extracted values that have been labeled with a high (e.g., coded green) or low (e.g., coded red) level of confidence. Selection of a color-coded entry may provide access to a validation user interface for the applicable file, e.g., to enable the user to validate (e.g., indicate the predicted value/label is correct and/or provide corrected information) the value and/or label. In some embodiments, values that have been validated (or input) by a user may be identified by a visual indication, such as a bold line, badge, fill color or pattern (or absence thereof), or other visual indication. In various embodiments, user input to validate low confidence predictions may be used to modify and/or increase the confidence level of corresponding predictions made in the same or other files.

FIG. 1 is a block diagram illustrating an embodiment of a data extraction system. In the example shown, system 100 includes a plurality of computing and/or data storage nodes 102 associated with an enterprise (or other) network 104. Examples of computing and/or data storage nodes 102 include, without limitation, client computers, mobile phones, tablet devices, and/or other client devices and systems; scanners, copiers, and other imaging devices and systems; and file servers, application servers, databases, and other data storage devices and systems. The nodes 102 are connected via enterprise network 104 and the Internet 106 to document ingestion and data extraction server 108. The nodes 102 provide documents 110 to server 108 via the enterprise network 104 and Internet 106, e.g., in batches, an ongoing stream, etc., depending on the systems and configuration. The terms "document" and "file" are used interchangeably herein and include, without limitation, images (e.g., photos, scanned images, etc.); word processing or other content creation application files; portable document format (PDF) or other files comprising unstructured, semi-structure, or structured data; and spreadsheets and other application files containing data organized in tabular form.

Referring further to FIG. 1, in the example shown, each document/file 110 is processed by server 108 to extract data. The data may comprise a plurality of key-value pairs. Data extraction may be performed, in various embodiments, based at least in part on a model with which a file is associated. For example, a training set of files may be processed manually to identify key-value pairs and the training set may be used to generate a model via machine learning. The machine learning generated model may be updated over time as additional instances of documents/files are processed. User input may be received to validate values predicted by a data extraction system as disclosed herein, based on the model, such as by updating predicted values that are not correct or confirming values that were predicted accurately. The user input may be used to update or refine the model, to increase the accuracy of predictions with respect to files processed subsequent to the model being updated or refined.

In the example shown in FIG. 1, values extracted from files 110 are stored in database 112. In some embodiments, database 112 may store data according to a schema generated as disclosed in U.S. Pat. No. 10,572,522, entitled DATABASE FOR UNSTRUCTURED DATA, issued Feb. 25, 2020, the entire contents of which are incorporate herein by reference for all purposes.

As shown in FIG. 1, a plurality of client systems/devices, represented in FIG. 1 by clients 114 and 116 have access via the Internet 106 to an extracted data access server 118. In various embodiments, extracted data access server 118 provides, via user interface computer code running on server 118, one or more graphical (or other) user interfaces to display in an efficient and interactive manner data extracted from related sets of documents/files 110.

In various embodiments, server 118 is configured (e.g., by software code running on one or more processors comprising server 118) to provide an interactive graphical user interface that includes a display in a tabular format and/or layout of data extracted from related sets of files 110. In some embodiments, the user interface displays in tabular form data associated with instances of a repeating entity, such as a "table" or "table row" entity, each of which includes a related set of key-value pairs as disclosed herein and described more fully below.

In various embodiments, user feedback received via one or more user interfaces provided by server 118, e.g., for display on clients such as 114 and 116, is used to update data in database 112, e.g., to replace predicted values with validated or user provided values, and/or is provided to document ingestion and data extraction server 108 to further inform the extraction of data from files processed in the future and/or to refine or update one or both of the predicted values and/or confidence score of predictions made with respect to one or more instances of files 110 that were processed previously. In some embodiments, user feedback received via user interaction with user interfaces provided by server 118 may be used to refine or update a model used to extract data from files 110.

While document ingestion and data extraction server 108, database 112, and extracted data access server 118 are represented in FIG. 1 each as a separate block, in various embodiments two or more of them may be combined and/or may reside on a shared set of one or more physical machines, such as one or more servers.

FIG. 2A is a diagram illustrating an example of a file such as may be processed in an embodiment of a data extraction system. In the example shown, file 200 includes a purchase order document. File 200 may comprises a PDF, a scanned image of a document, or any other file comprising unstructured, semi-structured, and/or structured data. In this example, file 200 includes text 202 identifying the document as a "Purchase Order". In some embodiments, optical character recognition (OCR) and/or other techniques may be used to classify the document as a purchase order based at least in part on the text 202. The size, placement, font, and/or other attributes of the text 202 may be used, in various embodiments, to further and/or more specifically classify the file 200 as a purchase order associated with a particular data owner and/or file source.

The text 204 may be recognized, in various embodiments, as a sender and/or other originator address, and one or more of the company name "Acme Corp", street number, street name, city, state, and zip code may be extracted and stored as one or more key-value pairs.

The text 206, in this example, may be recognized, for example based on one or more of a model associated with purchase order files from Acme Corp, the presence of the abbreviation "P.O." followed by "No." (or "#"), etc., as comprising a numerical (or alphanumerical) sequential purchase order number "9945", and may be stored (e.g., in database 112) as a key value-value pair, such as "purchase order number=9945".

The text 208 may be extracted and recognize to comprise a shipping address, e.g., based on the adjacency to the text "Ship to:" of text matching an address block pattern.

In this example, the file 200 further includes a first table 210 containing a set of column labels (top row) and a single row of values. In various embodiments, each value in the lower row may be extracted and stored as a key-value pair, e.g., using the corresponding column label and/or a label to which the extracted/predicted text of the column label is mapped as the key and the extracted value as the value, e.g., "date=3/1/21".

Finally, the file 200 includes a second table 212. Table 212 includes a set of column labels at top, three rows of purchase order item-level detail, and a "Total" at bottom representing the sum of the per-item totals shown in the last column of the middle three rows.

In various embodiments, each value in the middle three rows may be extracted and stored as a key-value pair, with the key being determined based on the corresponding column label, e.g., "quantity=200".

In various embodiments, a data extraction system as disclosed herein is configured to extract and store related sets of data, such as a related set of key-value pairs, as an instance of a repeating entity. For example, in various embodiments, a data extraction system as disclosed herein may be configured to associated key-value pairs comprising a given row of the table 212 as an instance of a repeating entity, such as a "purchase order item" entity. As described further below, in various embodiments related instances of such a repeating entity may be displayed, e.g., in a data extraction validation or other user interface, in a tabular format, with extracted values comprising a given instance being displayed on a same row (or column).

Figure 2B:
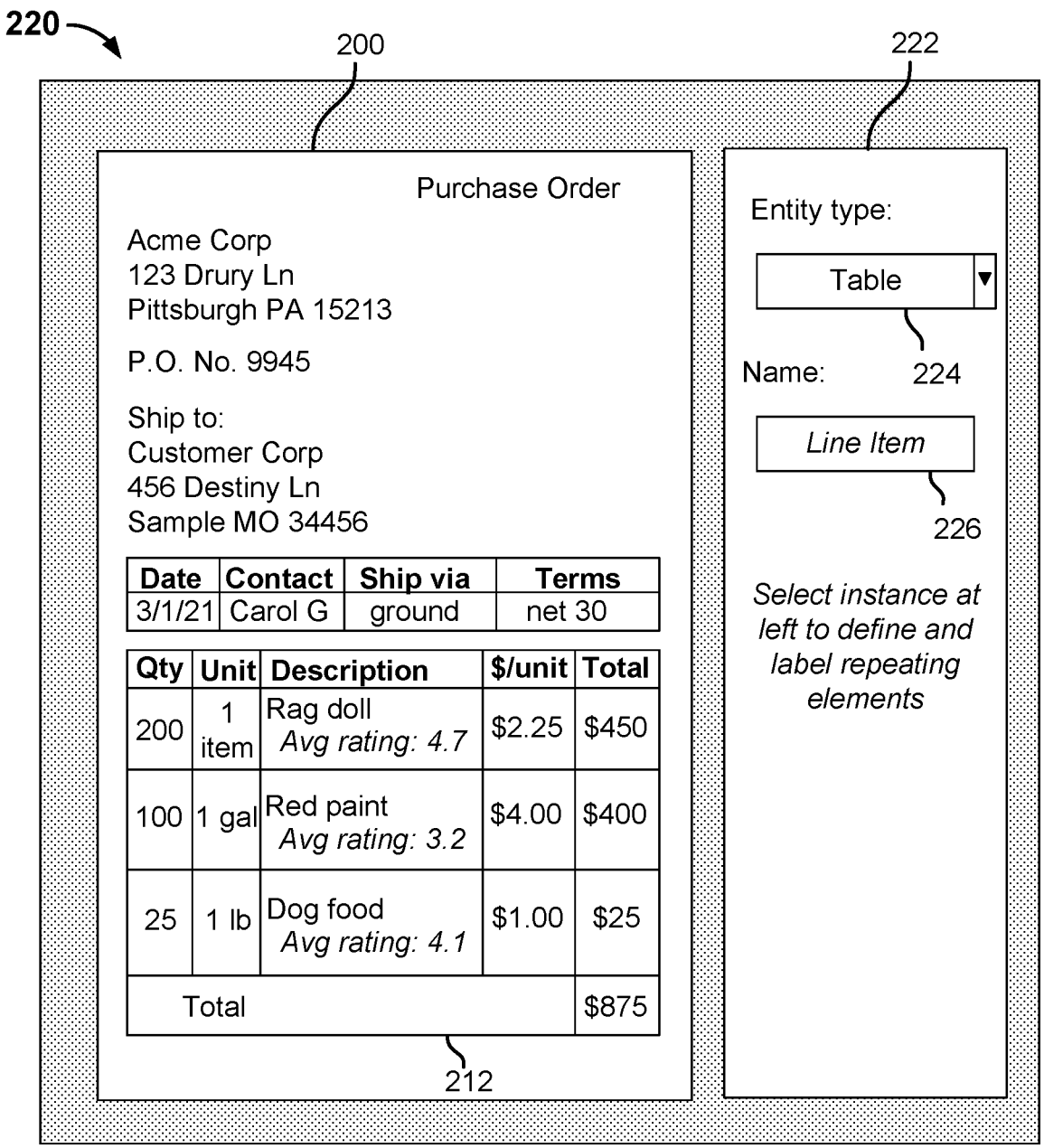
FIG. 2B is a diagram illustrating an embodiment of a repeating entity definition interface in an embodiment of a data extraction system.

FIG. 2B is a diagram illustrating an embodiment of a repeating entity definition interface in an embodiment of a data extraction system. In the example shown, user interface 220 includes a representation of file 200 and an extracted entity definition user interface 222. The representation of file 200 may include an image comprising and/or derived from file 200. In some embodiments, the representation of file 200 may be displayed with one or more interactive overlays, such as to highlight extracted values, display (e.g., on mouseover) key-value pairs extracted from the document, and/or to provide for each of at least a subset of extracted values a visual indication of a degree/level of confidence the system has in the "predicted" value extracted from the document 200.

In the extracted entity definition user interface 222, a "table" entity type has been selected in dropdown menu 224. In various embodiments, the "table" entity type is a repeating type and transitions the user interface 222 into a state that enables a repeating entity type to be defined. In this example, the text "Line Item" has been entered, e.g., by a user of user interface 220, to assign the name "Line Item" to the repeating ("Table") entity the user is defining. In this example, in response to a repeating entity type being indicated via dropdown menu 224, the user interface 222 displays an instruction to the user to select (e.g., draw a box around) a related set of instances of extracted values (key-value pairs) that make up an instance of the repeating entity to be defined.

Figure 2C:
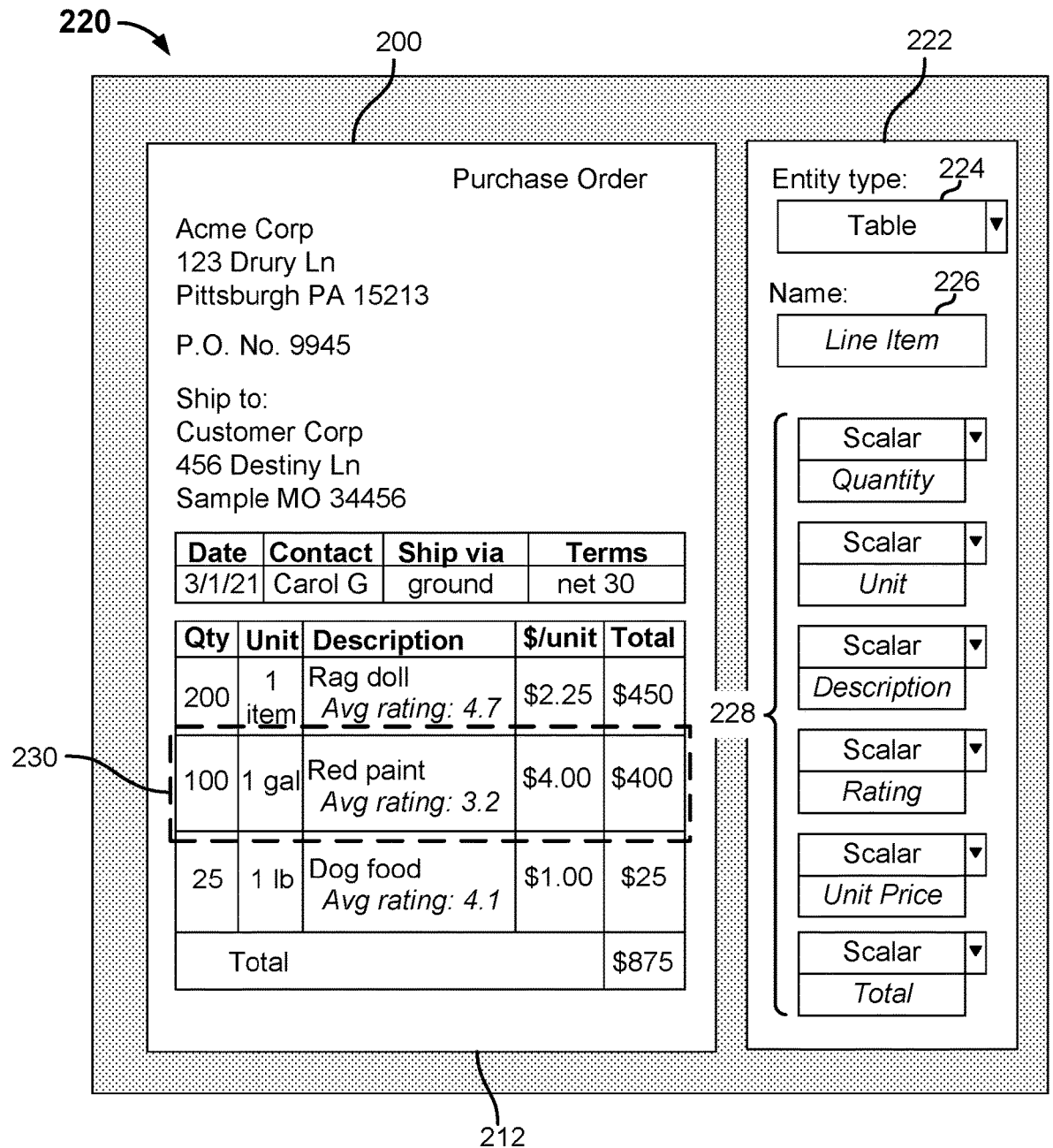
FIG. 2C is a diagram illustrating an embodiment of a repeating entity definition interface in an embodiment of a data extraction system.

FIG. 2C is a diagram illustrating an embodiment of a repeating entity definition interface in an embodiment of a data extraction system. In FIG. 2C, the user interface 220 of FIG. 2B is shown in a state in which a user has selected a set of values displayed within bounding box 230, in this example, as comprising an exemplary instance of the repeating entity, named "Line Item" by the user in this example, that is being defined. In response to the values within box 230 being selected, a set of field definition controls 228 is displayed, each to enable a corresponding extracted value data type to be indicated (e.g., scalar, other) and a human readable column label to be entered (e.g., "Quantity") to be used in a user interface to display extracted data in tabular format, as disclosed herein, e.g., as a column label.

FIG. 3A is a flow diagram illustrating an embodiment of a process to extract data from files. In various embodiments, the process 300 of FIG. 3A may be performed by one or more of the document ingestion and data extraction server 108 and the extracted data access server 118 of FIG. 1. In the example shown, at 302, a definition of a repeating set of entities, each entity comprising a key-value pair, in various embodiments, is received and stored. Multiple definitions, each corresponding to a defined repeating set of key-value pairs, such a table row, may be received. At 304, instances of input files are received and processed, including by detected and extracting ("predicting") values and identifying related sets of values (key-value pairs) each as an occurrence of a repeating entity type (e.g., table or row of a table). For example, referring to the file 200 of FIG. 2A, the values in each of the three middle rows of table 212 may be extracted, and the key-value pairs associated with each row may be grouped and associated with an occurrence of the repeating type entity named "Line Item" as defined via the user interface 220, 222 of FIGS. 2B and 2C. At 306, the key-value pairs extracted/predicted at 304 are stored, along with metadata identifying related groups of them each as an instance or occurrence of a repeating entity type, such as "Line Item" in the example above.

FIG. 3B is a flow diagram illustrating an embodiment of a process to provide an interactive tabular display of data extracted from a set of files. In various embodiments, the process 320 of FIG. 3B may be performed by one or more of the document ingestion and data extraction server 108 and the extracted data access server 118 of FIG. 1. In the example shown, at 322 an indication is received to display data extracted from a set of one or more files. At 324, data extracted from the file(s) is displayed in a tabular interactive user interface in which data comprising related occurrences of a repeating entity type are displayed in adjacent rows, as in the examples described below.

FIG. 4A is a diagram illustrating an embodiment of an interactive tabular display of data extracted from a set of files. In various embodiments, the user interface 400 of FIG. 4A is provided by a server, such as extracted data access server 118, for display on a client system, such as clients 114, 116 of FIG. 1. In the example shown, user interface 400 includes a first column 402, labeled "File" in this example, in which for each file from which data displayed via user interface 400 is included is identified by a corresponding filename or other identifier. A second set of columns 404 display extracted data associated with a repeating entity type, e.g., in the example shown the "Line Item" entity type defined via the user interface 220, 222 of FIGS. 2B and 2C. The column labels of the columns 404, in this example, are as defined by the user, e.g., via the user interface 220, 222 of FIGS. 2B and 2C, and each row of the user interface 400 corresponds to an occurrence of the repeating entity type, the rows associated with data extracted from a given file being group together and associated spatially with the file name (or other identifier) of the file from which those values were extracted. For example, in the example shown the rows 406 are associated with a file such as the file 200 as shown in FIGS. 2A, 2B, and 2C. The "File" column for this set of rows 406 identifies the file 200 by the file name "PO_9945.pdf", corresponding to the purchase order number "9945" extracted from the document. As shown, the rows 406 include three rows each displaying a corresponding occurrence of the repeating entity type "Line Item", in this example each row corresponding to one of the middle three rows of the table 212 of file 200, e.g., as shown in FIG. 2A.

In the example shown in FIG. 4A, only the three middle rows of table 212 have been identified each as an occurrence of the "Line Item" entity type. In another embodiments and/or scenario, the last row of table 212, indicating the "Total" price for the three line items listed above (i.e., the sum of the respective extended prices listed in the last column of each of the middle three rows of table 212) may initially have been identified in error as a "Line Item". In various embodiments, user interface 400 would provide a control to indicate to the data extraction system that the row had been miscategorized as a "Line Item" and instead, in this example, be stored as a single key-value pair, such as "Total Price in Dollars for all Line Items=875".

Referring further to FIG. 4A, in the example shown, each row corresponding to a "Line Item" is identified by a sequential number, e.g., "1", "2", or "3" in the rows 406. A control above the sequential numbers would allow the lines for that file to be collapsed and, for example, an indication of the number of line items in that file to be displayed without showing the line-item detail. Such an approach may allow for more files to be represented and validated efficiently via the user interface 400.

In various embodiments, a visual indication may be provided for each file, each row, and/or individual extracted values to indicate a state of validation. For example, green may be used to highlight extracted values that have been predicted with high confidence and red may be used to indicate extracted values that have been predicted but without reach a prescribed threshold level of confidence. Further, a visual indication may be provided to indicate that a user has entered and/or confirmed previously-predicted values.

FIG. 4B is a diagram illustrating an embodiment of an interactive tabular display of data extracted from a set of files. In the example and state shown, color-coded bars displayed immediately to the left of predicted values indicate a degree of confidence. For example, in the rows 406, the small rectangles with cross-hatched fill (to indicate the color "green", for example) are values that have been predicted with a high (e.g., greater than threshold) level of confidence, while those with small rectangles filled with vertical lines (to indicate the color "red", for example) have been predicted but with less than a threshold degree of confidence. For example, the data extraction system may use a model, rules, heuristics, regular expressions, etc. to extract values, and for each a confidence score may be assigned. Those predicted values having a confidence score above a prescribed threshold may have a green color-coded visual indication, and those predicted with less confidence may be color-coded in red.

Referring further to FIG. 4B, in the state shown the top set of values in the rows 408, associated with the file name "PO_11341.pdf" are marked with rectangles with solid black fill, in this example to indicate values that have been entered manually and/or otherwise validated by a user. For example, in various embodiments, selection of an extracted value or row of values within user interface 400 may result in a data validation screen or set of screens being displayed. Controls and/or editable text boxes within the data validation screen or set of screens would enable a user to confirm the accuracy of a predicted value or set of values and/or edit or otherwise provide corrected and/or missing values. Upon submitting such corrections, in various embodiments, the user interface 400 may be updated to reflect that the validated values have been validated by a user.

In various embodiments, user input to validate and/or correct predicted values may be used to adjust the confidence score associated with one or more other occurrences of the same and/or corresponding values. For example, in the example shown in FIG. 4B, validation of the "Rating" associated with "Rag Dolls" in the context of the rows 406 may result in the confidence associated with the value predicted for the corresponding instance of the same rating in the context of the rows 410 being updated, and the corresponding visual indication being changed from red to green, in real time in some embodiments. Similarly, validation of the first row of data in the rows 408, in the example shown, may have resulted in the confidence and associated visual indication(s) being increased for corresponding values in the second row of values in the rows 410, resulting in them being color coded as "green", as shown.

In various embodiments, the user interface 400 of FIGS. 4A and 4B may provide spreadsheet functionality and/or table formatting and manipulation features. For example, in various embodiments, a user may select, move, copy, or delete rows and/or may define new cells and/or rows, including by using spreadsheet functions, cross references, etc. Similarly, in various embodiments highlight, fill colors, text appearance, and other display attributes, features, etc., may be available, to enable a user to encode user-defined information, such as to track rows associated with a given customer or region. Similarly, data sorting and similar functionality may be enabled.

FIG. 5 is a diagram illustrating an embodiment of a extracted data validation interface in an embodiment of a data extraction system. In various embodiments, the user interface 220 and validation interface 500, as shown in FIG. 5, may be displayed upon selection of a control or predicted value associated with the rows 406 as shown in FIGS. 4A and 4B. In this example, the underlying file 200 is represented at left with red bounding boxes displayed around the two values that have been predicted with lower confidence. Note the user of user interface 400 of FIGS. 4B, for example, would know from the red color coding of the corresponding values as displayed in user interface 400 of FIG. 4B that date validation was required to confirm (or correct) the predicted values. In the example shown in FIG. 5, the data validation interface 500 displays an interactive validation interface element 502 to validate the predicted value for the "Rating" extracted/predicted from the first of the three middle rows of table 212 of file 200. A dropdown allows the user to select the corresponding key or label, "Rating" in this example. The predicted value is displayed in element 502. If correct, selection of the "submit" control 506 validates the predicted value. If the predicted value is not correct, the user enters the correct value in element 502 and selected "Submit" control 506 to replace the predicted value with the user-entered value. In this example, a second data validation element 504 is shown in a "ghosted" representation to indicate it is not selected/active or not displayed in the state as shown in FIG. 5. Selection of the "Qty" value in the third row of the middle rows of table 212, as displayed, would result in the element 504 being displayed and/or becoming active, enabling the user to validate or correct the predicted value. As values are validated, in various embodiments, the representation of file 200 may be updated to reflect that a validated value is no longer in need of validation.

Figure 6:
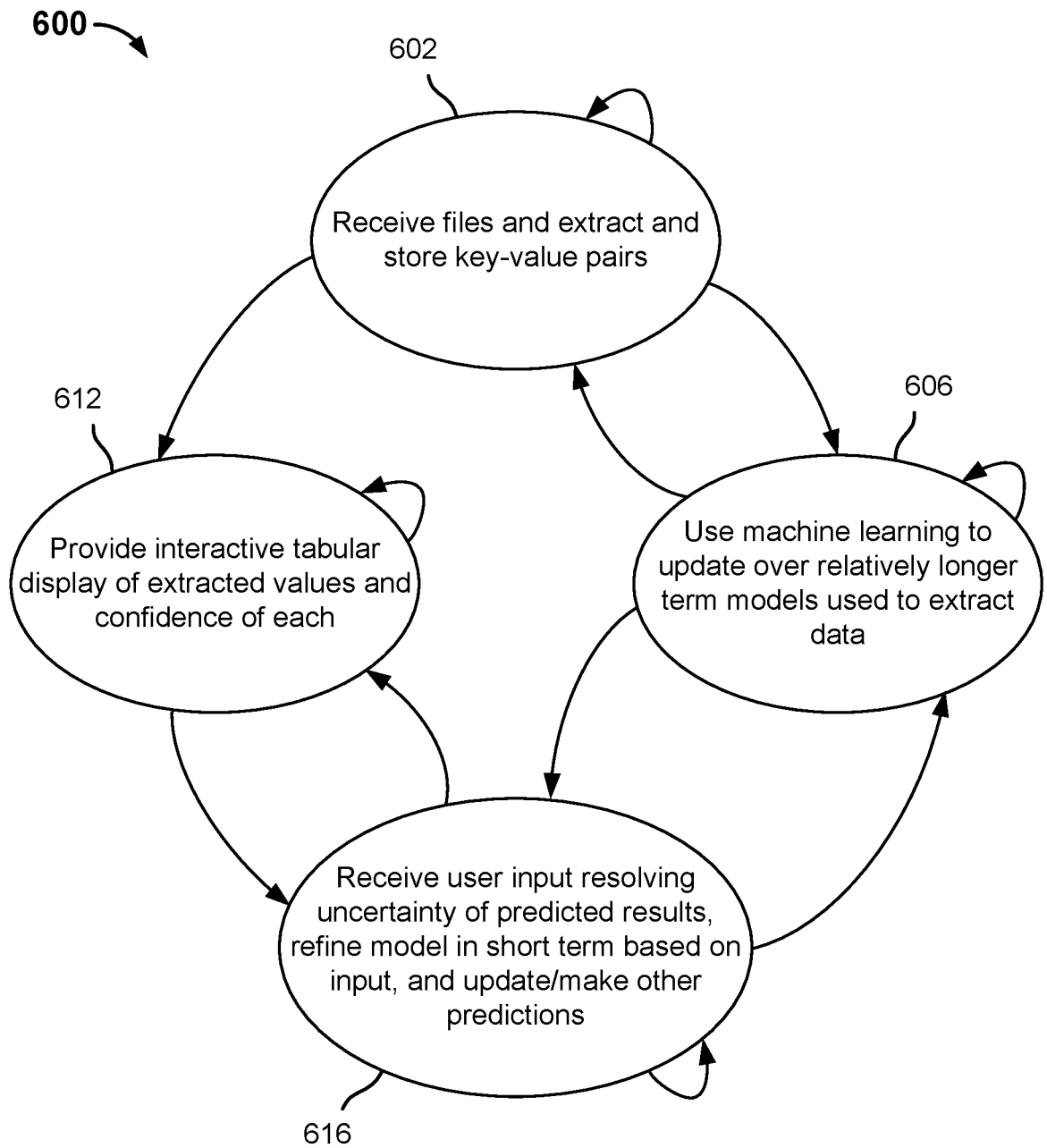
FIG. 6 is a state diagram illustrate states of one or more processing modules comprising an embodiment of a data extraction system.

FIG. 6 is a state diagram illustrate states of one or more processing modules comprising an embodiment of a data extraction system. In various embodiments, different modules comprising a data extraction system as disclosed herein may be in one or more of the states shown in FIG. 6. For example, one module may be in one state and another module in another state, or a module may be in one state with respect to one set of files and a different state with respect to another set of files.

In the example shown in FIG. 6, in a first state 602 files are received and a key-value pairs of data are extracted. Extracted (predicted) values and user feedback on the accuracy of such predictions may be used in a second state 606, in which machine learning techniques are used to generate and update one or more models to be used to make future predictions, for example with respect to files received and/or processed in the future and/or to re-process with greater accuracy files received and processed previously. In a third state 612, an interactive user interface comprising a tabular display of data, as in the example shown in FIGS. 4A and 4B, is provided. In a fourth state 616, user input is received, e.g., via a data validation interface as shown in FIG. 5. The user input received with respect to a first value may be used to update the predicted values and/or confidence associated with one or more other predicted values, e.g., other values that are predicted for the same reason or similar reasons and/or for which confidence was judged to be low for the same or similar reasons as a predicted value the user validated.

In various embodiments, techniques disclosed herein may be used to display and facilitate validation of extracted/predicted data efficiently.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system, comprising:
a communication interface configured to receive a file; and
a processor coupled to the communication interface and configured to:
extract a plurality of data entities from the file, each entity comprising a key-value pair;
identify among the plurality of data entities one or more sets of related entities, each set comprising an occurrence of a defined repeating type of entity set; and
store data associating the one or more sets of related entities with the file and the defined repeating type of entity set.

2. The system of claim 1, wherein the processor is further configured to use the stored data associating the one or more sets of related entities with the file and the defined repeating type of entity set to provide an extracted data validation user interface in which each of the one or more sets of related entities is displayed as a corresponding row.

3. The system of claim 2, wherein the extracted data validation user interface displays data extracted from a plurality of files and for each file the extracted data validation user interface includes a display of one or more rows, each row corresponding to and displaying extracted values associated with a corresponding set of related entities.

4. The system of claim 3, wherein extracted data validation user interface provides one or more features associated with a spreadsheet application.

5. The system of claim 3, wherein the extracted data validation user interface includes for at least a subset of entities displayed in at least a subset of rows a visual indication of a state of validation of one or both of a data value and a label associated with that entity.

6. The system of claim 5, wherein the visual indication includes a color code reflecting a degree of confidence.

7. The system of claim 5, wherein the extracted data validation user interface includes for each of at least said subset of entities displayed in at least said subset of rows a user-selectable control to access a file data validation interface for one or both of the entity and a corresponding one of said plurality of files with which the entity is associated.

8. The system of claim 7, wherein the file data validation interface includes a first region in which data representing the corresponding one of said plurality of files is displayed and a second region that includes an interactive data validation element to validate one or both of a data value and a label associated with an entity comprising the file.

9. The system of claim 8, wherein said interactive data validation element is displayed in response to selection of a representation of said entity within the first region.

10. The system of claim 8, wherein the processor is configured to receive via the interactive data validation element a user input indicating validation of one or both of the data value and the label associated with the entity; and the processor is further configured to update the extracted data validation user interface to reflect validation of the entity.

11. The system of claim 10, wherein the file comprises a first file included in said plurality of files and the validated entity comprises a first entity; and wherein the processor is configured to update the extracted data validation user interface to reflect validation of the first entity; and to update a second entity associated with a second file based on a reevaluation in real time of a confidence associated with a one or both of a predicted value and a predicted label associated with the second entity, the reevaluation being determined based at least in part on the validation of the first entity.

12. The system of claim 10, wherein the processor is further configured to update a data extraction model based at least in part on the validation of the entity.

13. The system of claim 12, wherein the processor is configured to update the data extraction model at least in part by providing data associated with validation of the entity to a machine learning process or module.

14. The system of claim 1, wherein the processor is further configured to receive a definition of said repeating type of entity set.

15. The system of claim 14, wherein the definition is received via a data extraction configuration user interface and wherein the processor is further configured to display the data extraction configuration user interface.

16. The system of claim 15, wherein the data extraction configuration user interface enables a user to select an instance of a set of related entities as represented in a displayed representation of a file with which the set of related entities is associated and to define the repeating type of entity set in relation to the selected instance of the set of related entities.

17. A method, comprising:
extracting a plurality of data entities from a file, each entity comprising a key-value pair;
identifying among the plurality of data entities one or more sets of related entities, each set comprising an occurrence of a defined repeating type of entity set; and
storing data associating the one or more sets of related entities with the file and the defined repeating type of entity set.

18. The method of claim 17, further comprising using the stored data associating the one or more sets of related entities with the file and the defined repeating type of entity set to provide an extracted data validation user interface in which each of the one or more sets of related entities is displayed as a corresponding row.

19. The method of claim 18, wherein the extracted data validation user interface displays data is extracted from a plurality of files and for each file the extracted data validation user interface includes a display of one or more rows, each row corresponding to and displaying extracted values associated with a corresponding set of related entities.

20. A computer program product embodied in a non-transitory computer readable medium, comprising computer instructions for:
- extracting a plurality of data entities from a file, each entity comprising a key-value pair;
- identifying among the plurality of data entities one or more sets of related entities, each set comprising an occurrence of a defined repeating type of entity set; and
- storing data associating the one or more sets of related entities with the file and the defined repeating type of entity set.

* * * * *